US008433286B2

(12) United States Patent
Suh et al.

(10) Patent No.: US 8,433,286 B2
(45) Date of Patent: Apr. 30, 2013

(54) MOBILE COMMUNICATION NETWORK AND METHOD AND APPARATUS FOR AUTHENTICATING MOBILE NODE IN THE MOBILE COMMUNICATION NETWORK

(75) Inventors: Kyung-Joo Suh, Seoul (KR); Ji-Cheol Lee, Yongin-si (KR); Jung-Soo Jung, Seongnam-si (KR); Beom-Sik Bae, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1440 days.

(21) Appl. No.: 12/053,217

(22) Filed: Mar. 21, 2008

(65) Prior Publication Data

US 2008/0311906 A1 Dec. 18, 2008

(30) Foreign Application Priority Data

Mar. 21, 2007 (KR) ........................ 10-2007-0027865

(51) Int. Cl.
*H04M 1/66* (2006.01)
(52) U.S. Cl.
USPC ........ 455/411; 455/435.1; 455/245; 370/245; 370/236; 713/155; 713/171
(58) Field of Classification Search ........................ None
See application file for complete search history.

(56) References Cited

U.S. PATENT DOCUMENTS

| 7,724,904 | B2 | 5/2010 | Lee et al. | |
|---|---|---|---|---|
| 2005/0081036 | A1* | 4/2005 | Hsu | 713/171 |
| 2007/0112967 | A1 | 5/2007 | Lee et al. | |
| 2007/0155376 | A1* | 7/2007 | Payyappilly et al. | 455/422.1 |
| 2007/0217610 | A1* | 9/2007 | Yegani et al. | 380/270 |
| 2008/0072047 | A1* | 3/2008 | Sarikaya et al. | 713/171 |
| 2009/0019284 | A1* | 1/2009 | Cho et al. | 713/170 |
| 2009/0217033 | A1* | 8/2009 | Costa et al. | 713/155 |

FOREIGN PATENT DOCUMENTS

| KR | 1020050109685 | 11/2005 |
|---|---|---|
| KR | 1020070003484 | 1/2007 |
| KR | 1020070051233 | 5/2007 |

\* cited by examiner

*Primary Examiner* — Marcos Batista
*Assistant Examiner* — Keith Fang
(74) *Attorney, Agent, or Firm* — The Farrell Law Firm, P.C.

(57) ABSTRACT

A method and apparatus for performing device authentication and user authentication in a mobile communication network are provided. A connection is established between an MS and an SRNC that controls communications of the MS through a BS. The SRNC receives a D-MSK for device authentication of the MS from an AAA server that has completed an EAP negotiation with the MS and stores the D-MSK by the SRNC, when the BS triggers an EAP authentication after the connection establishment. The SRNC receives an R-MSK from an AG and stores the R-MSK after the connection establishment. The R-MSK is generated using a U-MSK for user authentication of the MS received from the AAA server by the AG. The SRNC generates a PMK for use during a session using at least one of the D-MSK and the R-MSK, and one of the BS and the SRNC generate a key set using the PMK, for use in at least one of data encryption, data integrity check, and session management during the session.

14 Claims, 9 Drawing Sheets

MOBILE COMMUNICATION NETWORK AND METHOD AND APPARATUS FOR AUTHENTICATING MOBILE NODE IN THE MOBILE COMMUNICATION NETWORK

PRIORITY

This application claims priority under 35 U.S.C. §119(a) to a Korean Patent Application filed in the Korean Intellectual Property Office on Mar. 21, 2007 and assigned Serial No. 2007-27865, the entire disclosure of which is incorporated herein by reference.

BACKGROUND OF THE INVENTION

1. Field of the Invention

The present invention relates generally to a mobile communication system, and more particularly, to a method for authenticating and authorizing a mobile node in a mobile communication network, and a mobile communication network using the same.

2. Description of the Related Art

In a mobile communication system such as $3^{rd}$ Generation Partnership Project 2 (3GPP2) Code Division Multiple Access 1x (CDMA 1x) and Evolution-Data Only (EV-DO), a Base Station (BS) is responsible for managing radio resources and a network entity within a core network, Packet Data Serving Node (PDSN), carries out packet communication-related procedures.

Since the mobile communication system typically operates via a Point-to-Point Protocol (PPP), a Challenge Handshake Authentication Protocol (CHAP) or a Password Authentication Protocol (PAP), which is a framework that can work above the PPP, is used for user authentication or device authentication. However, these protocols are not viable for an Ultra Mobile Broadband (UMB) system developed by the 3GPP2 to transmit more data at higher rates. Hence, an authentication and security technique that can support the UMB more efficiently is needed.

Conventional authentication and security technologies for a 1xEV-DO system are not effective in perfect protection against channel hijacking and allows for unauthorized use of a service without payment of a lawful charge for the service. Moreover, the conventional system is vulnerable to denial of a service caused by a message attack at a protocol level as well as at a Radio Frequency (RF) level. Accordingly, there is a need for a system and a communication network that enable secure communications.

SUMMARY OF THE INVENTION

The present invention has been made to address at least the above problems and/or disadvantages and to provide at least the advantages described below. Accordingly, an aspect of the present invention provides a method for efficiently performing device authentication and user authentication during an initial call setup, and a mobile communication network using the same in a mobile communication system.

Another aspect of the present invention provides a method for performing authentication and ensuring security by the Extensible Authentication Protocol (EAP) in a PPP-free fashion in a mobile communication network, and a mobile communication network using the same.

A further aspect of the present invention provides a method for performing device authentication and user authentication more securely and more efficiently even when network nodes responsible for controlling signaling for a mobile node are logically or physically separated, and a mobile communication network using the same in an evolved mobile communication system such as 3GPP2 UMB.

According to one aspect of the present invention, a method is provided for performing device authentication and user authentication of an MS in a mobile communication network. A connection is established between the MS and an SRNC that controls communications of the MS through a BS. The SRNC receives a D-MSK for device authentication of the MS from an AAA server that has completed an EAP negotiation with the MS and stores the D-MSK by the SRNC, when the BS triggers an EAP authentication after the connection establishment. The SRNC receives an R-MSK from an AG and stores the R-MSK after the connection establishment. The R-MSK is generated using a U-MSK for user authentication of the MS received from the AAA server by the AG. The SRNC generates a PMK for use during a session using at least one of the D-MSK and the R-MSK. One of the BS and the SRNC generate a key set using the PMK, for use in at least one of data encryption, data integrity check, and session management during the session.

According to another aspect of the present invention, a mobile communication network is provided for performing device authentication and user authentication of an MS. A BS is connected to the MS by an RLP. An SRNC receives a D-MSK for device authentication of the MS from an AAA server that has completed an EAP negotiation with the MS and stores the D-MSK, when the BS triggers an EAP authentication after a connection is established with the MS through the BS. The SRNC receives an R-MSK from an AG and stores the R-MSK. The R-MSK is generated using a U-MSK for user authentication of the MS received from the AAA server by the AG. The SRNC generates a PMK for use during a session using at least one of the D-MSK and the R-MSK. Herein, a key set is generated using the PMK by one of the BS and the SRNC, for use in at least one of data encryption, data integrity check, and session management during the session.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF PREFERRED EMBODIMENTS

Figure 1:
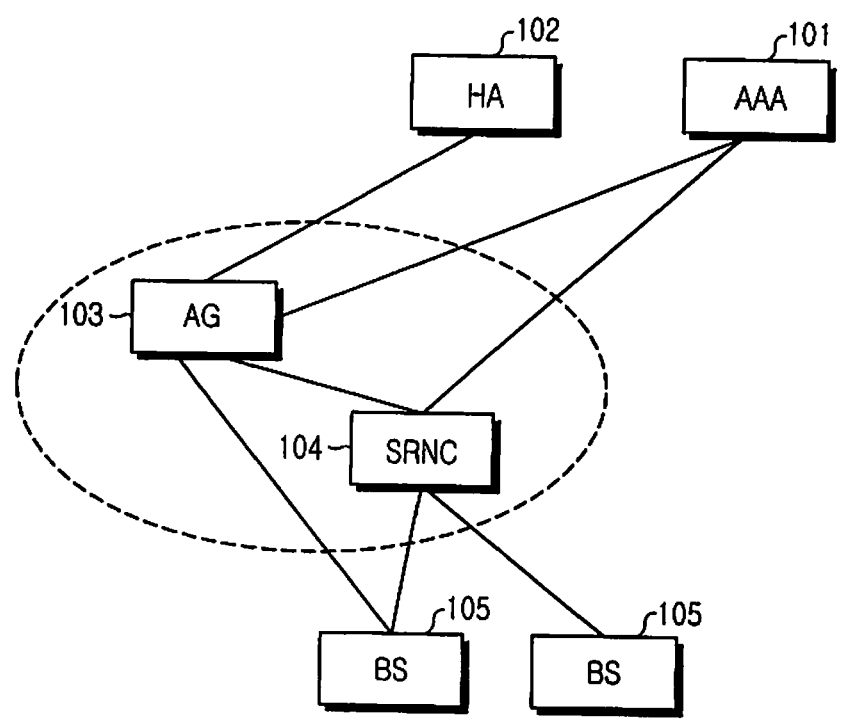
FIG. 1 is a block diagram illustrating a mobile communication network environment according to an embodiment of the present invention.

Preferred embodiments of the present invention are described in detail with reference to the accompanying drawings. It should be noted that the similar components are designated by similar reference numerals although they are illustrated in different drawings. Detailed descriptions of constructions or processes known in the art may be omitted to avoid obscuring the subject matter of the present invention.

Preferred embodiments of the present invention provide an authentication, authorization, and security technique for a mobile communication network. While the present invention will be described in the context of a 3GPP2 UMB system, it is to be clearly understood by those skilled in the art that an authentication and security method for a mobile communication network according to the present invention is also applicable to other mobile communication systems having a similar technological background and channel structure with a slight modification made within the scope and spirit of the present invention.

FIG. 1 is a block diagram of a mobile communication network environment according to an embodiment of the present invention. The mobile communication network is a 3GPP UMB network, for example.

Referring to FIG. 1, each of BSs 105 establishes radio connections with Mobile Stations (MSs, not shown) within its service area, i.e. cell, and communicates with the MSs via the radio connections. When an MS is in idle mode, an SRNC 104 controls signaling of the MS through the BS 105. The BS 105 connects the MS to a packet data network such as the Internet through an Access Gateway (AG) 103. In FIG. 1, significant network entities in the packet data network, i.e. a Home Agent (HA) 102 and an Authentication, Authorization, and Accounting (AAA) server 101, are shown. If an authenticator for device authentication of the MS is in the SRNC 104, the SRNC 104 having an interface with the AAA server 101 is used for device authentication, as described below.

Interfaces exist between the BS 105 and the SRNC 104 and between the AG 103 and the SRNC 104 for managing the mobility of the MS, and a data path exists between the AG 103 and the BS 105. To authenticate the MS, the SRNC 104 is provided with a device authenticator (not shown) and the AG 103 has a user authenticator (not shown). While it will be described herein that the AG 103 and the SRNC 104 are incorporated into a single physical entity for authentication, the same effect is achieved as far as an appropriate interface provided between the AG 103 and the SRNC 104, even when the SRNC 104 is configured to be a separate physical entity.

Figure 2A:
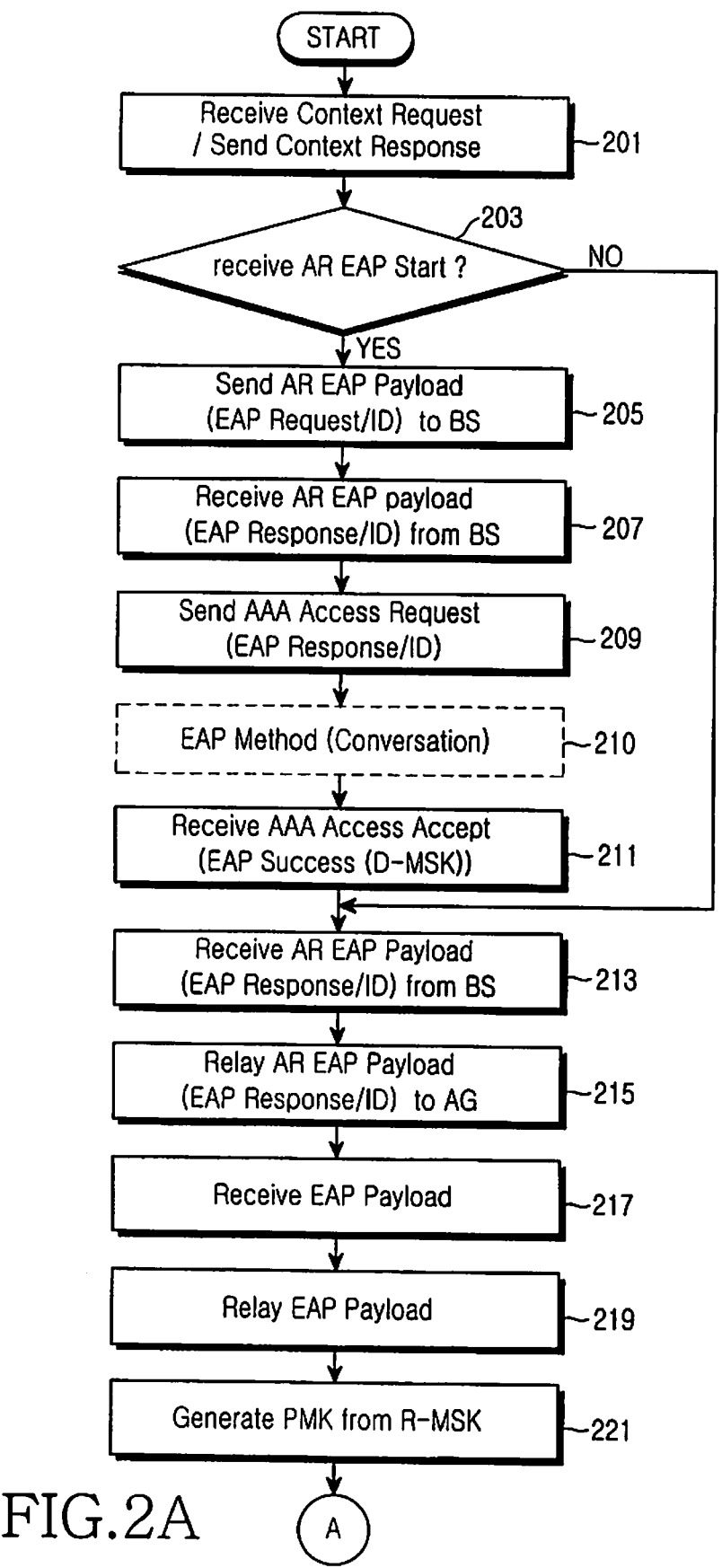
FIGS. 2A and 2B are a flowchart illustrating an operation of a Signaling Radio Network Controller (SRNC) according to an embodiment of the present invention.
Figure 2B:
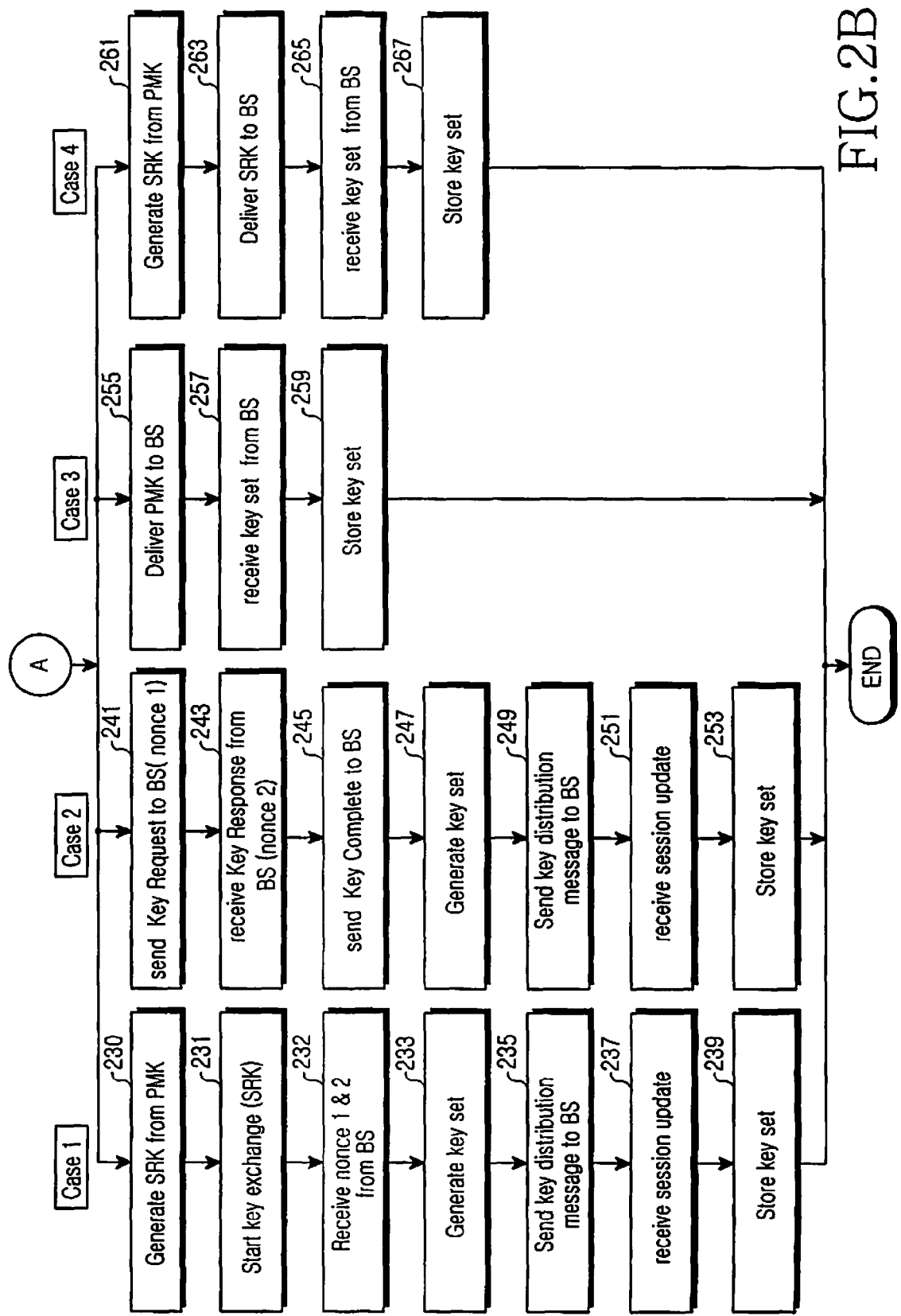

FIGS. 2A and 2B are a flowchart illustrating an operation of the SRNC according to an embodiment of the present invention. Dotted blocks denote optional steps, which means steps that can be skipped.

Referring to FIGS. 2A and 2B, the SRNC receives a request message including a Context Request or a Session Fetch Request from the BS and replies with a Context Response message or a Session Fetch Response message in step 201. The Context Request message and the Session Fetch Request message request a context including session information to establish a communication path. Upon receipt of an Authentication Relay (AR) EAP Start message-requesting authentication from the BS in step 203, the SRNC transmits to the BS an AR EAP Payload message in which an EAP Request message with a Network Access Identifier (NAI) is encapsulated in step 205. The EAP Request message with the NAI is herein referred to as an EAP Request/IDentifier (ID) where the ID is an identifier field in the EAP Request message.

Upon receipt of an AR EAP Payload message having an EAP Response message with the NAI encapsulated from the BS in step 207, the SRNC transmits an AAA Access Request message with the EAP Response message to the AAA server in order to perform an EAP authentication procedure in step 209. Hereinafter, the EAP Response message with the NAI is referred to as the EAP Response/ID. In step 210, an EAP conversation can be conducted between the SRNC and the AAA server according to an EAP method. When the EAP conversation is completed, the SRNC receives an EAP Success message indicating success of the EAP authentication and a Device-Master Session Key (D-MSK) related to device authentication from the AAA server by an AAA Access Accept message in step 211 and then goes to step 213. The EAP Success message and the D-MSK are encapsulated in the AAA Access Accept message. The D-MSK is a master key for use in device authentication. The SRNC can use the D-MSK for generating a Pairwise Master Key (PMK).

If the SRNC has not received the AR EAP Start message directly from the BS in step 203, the process jumps to step 213. When receiving an AR EAP Payload message having an EAP Response/ID with the NAI from the BS in step 213, the SRNC relays the AR EAP Payload message having the EAP Response/ID to the AG in step 215. The EAP Response/ID is generated by the BS in response to an EAP Request/ID received directly from the AG.

In step 217, the SRNC receives from the AG an EAP payload message in which an EAP Success message related to the EAP Response/ID is encapsulated. This EAP payload message with the EAP Success message encapsulated includes a Root-MSK (R-MSK) that the AG has generated based on a User-MSK (U-MSK). The U-MSK is used for user authentication. The AAA server generates the U-MSK based on a long-term credential and provides it to the AG, for generation of the R-MSK. The R-MSK can be used for generating a PMK. In step 219, the SRNC relays the EAP payload message with the EAP Success message encapsulated to the BS. The SRNC generates the PMK using the R-MSK in step 211. The PMK is used for generation of data encryption-relayed keys to be used during a session, for generation of keys to be used for data integrity check, or for generation of a Session Root Key (SRK). In another example, the SRK can be used for generation of data encryption-relayed keys to be used during a session or for generation of data integration keys.

In accordance with the present invention, the D-MSK and the U-MSK are used for device authentication and user authentication, respectively. The D-MSK and the U-MSK are induced from the long-term credential or an Extended-MSK (E-MSK) induced from the long-term credential. If the U-MSK is used, the SRNC receives the R-MSK generated from the U-MSK from the AG, generates the PMK using the R-MSK, and generates the data encryption-related keys using the PMK.

The data encryption-relayed keys are used for at least one of data encryption and data integrity check. In the present invention, four cases of generating the data encryption-related keys are presented, which are depicted separately in FIG. 2B.

In Case 1, in step 230, the SRNC generates an SRK being a root key by which to generate keys used during a session, using the PMK generated in step 221. The SRNC transmits the SRK in a key exchange start message to trigger a key exchange of the BS in step 231 and receives two nonces, 'nonce 1' and 'nonce 2' for the key exchange from the BS in step 232. In step 233, the SRNC generates a set of keys to be used for data encryption and data integrity check using the PMK. The SRNC transmits a Key Distribution message including the key set to the BS in step 235. Upon receipt of a Session Update message in response to the Key Distribution message from the BS in step 237, the SRNC stores the key set for use during a session established for data communications with the MS in step 239.

In Case 2, the SRNC generates a first nonce, nonce 1 for a key exchange and transmits a Key Request message including nonce 1 to the BS in step 241. The BS relays the Key Request message to the MS. The SRNC receives a Key Response message including a second nonce, nonce 2 generated in correspondence with nonce 1 from the BS in step 243 and transmits a Key Complete message indicating completion of the key exchange to the BS in step 245. In step 247, the SRNC generates a set of keys to be used for data encryption and data integrity check using the PMK generated in step 221. The SRNC transmits a Key Distribution message including the key set to the BS in step 249. Upon receipt of a Session Update message in response to the Key Distribution message from the BS in step 251, the SRNC stores the key set in step 253.

In Case 3, the SRNC transmits the PMK generated in step 221 to the BS in step 255 and receives a set of keys to be used for data encryption and data integrity from the BS in step 257. That is, the BS generates the key set using the PMK and provides it to the SRNC, rather than the SRNC generates the key set. In step 259, the SRNC stores the key set for use in the data encryption and the data integrity check.

In Case 4, in step 261, the SRNC generates an SRK using the PMK generated in step 221. The SRNC transmits the SRK to the BS in step 263. The BS then generates a key set using the SRK. The SRNC receives the key set from the BS in step 265 and stores it in step 267.

By and large, the present invention provides (1) a connection setup and session negotiation-related procedure, (2) a device authentication procedure, (3) a user authentication procedure, (4) a procedure for generating a key set for data encryption and data integrity check, updating a session, and storing the key set, (5) a data bearer setup-related procedure, and (6) a Dynamic Host Configuration Protocol (DHCP)-related procedure in the case of using a simple Internet Protocol (IP) for IP address allocation. Procedures (1) and (2) will be described with reference to FIG. 3, Procedure (3) with reference to FIG. 4, and Procedures (4), (5) and (6) with reference to FIGS. 5 to 8 in four exemplary embodiments of the present invention. The four exemplary embodiments of the present invention are realized separately depending on whether a PMK itself or an SRK induced from the PMK is used and whether the SRNC or the BS generates keys for data encryption and data integrity check using the PMK or the SRK.

Figure 3:
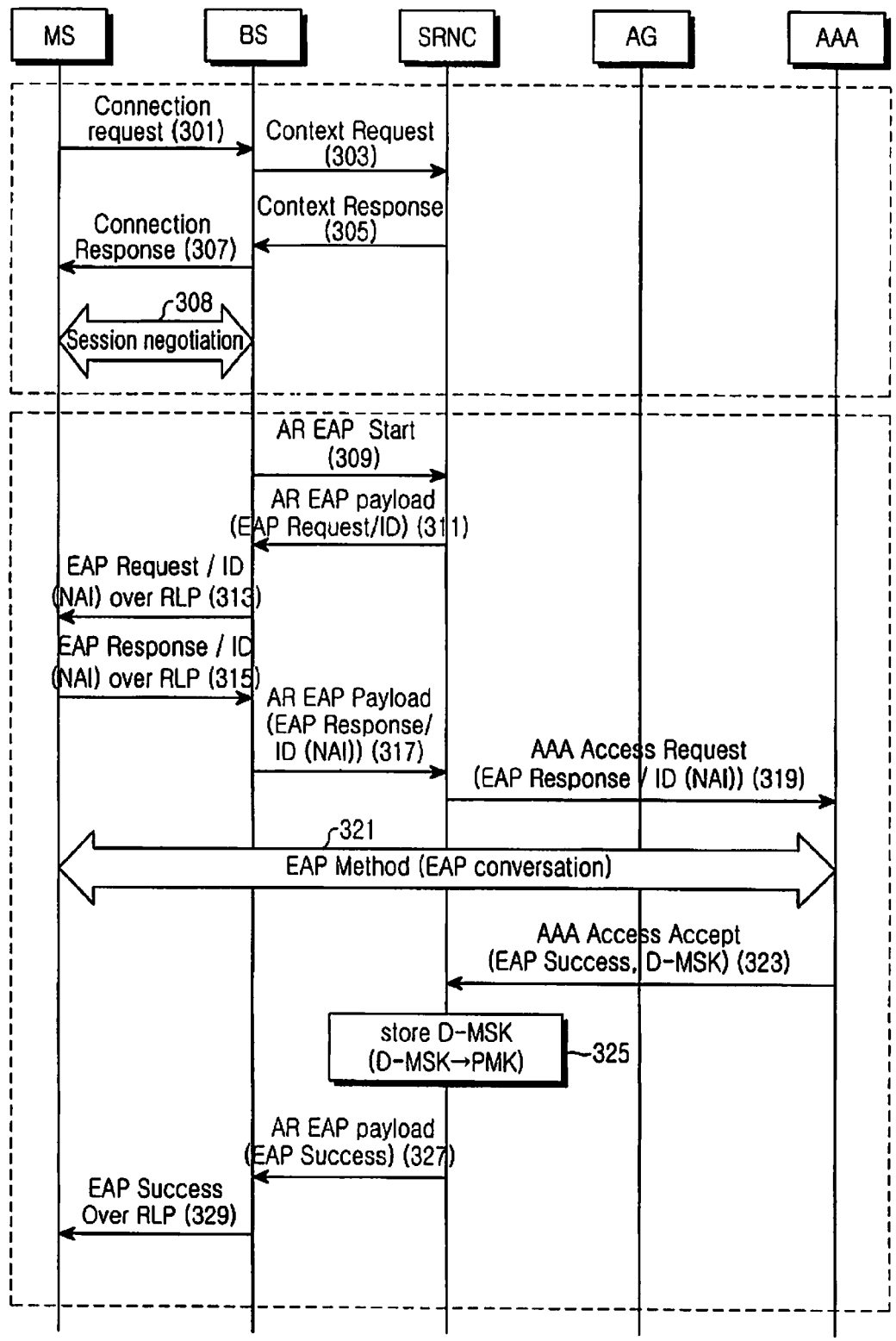
FIG. 3 is a diagram illustrating a message flow for a connection and device authentication procedure according to an embodiment of the present invention.

FIG. 3 is a diagram illustrating a message flow for a connection and device authentication procedure according to an exemplary embodiment of the present invention. Device authentication takes place in the SRNC and it is optional. That is, although device authentication and user authentication are performed independently according to a service provider's decision, if the device authentication and the user authentication take place simultaneously, an MSK used for the user authentication is used as a root key for the entire authentication. Meanwhile, when the SRNC is incorporated in the AG, the device authentication of the SRNC and the device authentication of the AG are carried out in the same procedure.

Referring to FIG. 3, upon receipt of a connection request message, for example, a route request message from the MS in step 301, the BS transmits a Context Request message to the SRNC to request a session in step 303. When the SRNC delivers a Context Response message including session information to the BS in step 305, the BS transmits to the MS in step 307 a connection response message for the connection request of the MS. Then a session negotiation/configuration is carried out in step 308.

After the connection setup and session negotiation is completed, device authentication is performed in steps 309 to 329. In step 309, the BS transmits an AR EAP Start message to the SRNC to trigger the SRNC's transmission of an EAP Request message. When the SRNC transmits an AR EAP Payload message with an EAP Request/ID encapsulated to the BS in step 311, the BS transmits an EAP Request/ID Radio Link Protocol (RLP) message including the EAP Request/ID to the MS by the RLP in step 313.

The MS transmits an EAP Response/ID RLP message having an EAP Response/ID with a NAI to the BS by the RLP in response to the EAP Request/ID in step 315, and the BS transmits an AR EAP Payload message having the EAP Response/ID encapsulated to the SRNC in step 317. In step 319, the SRNC transmits to the AAA server the EAP Response/ID in an AAA Access Accept message such as a Remote Authentication Dial-In User Service (RADIUS) access request message or an access request message based on the Diameter AAA protocol. Thus, an EAP negotiation is made between the MS and the AAA server according to an EAP method through the SRNC in step 321. Many procedures are involved in step 321, which are beyond the scope of the present invention and thus will not be described in detail herein.

When the EAP negotiation is completed, the AAA server transmits an EAP Success message and a D-MSK to the SRNC by an AAA Access Accept message in step 323, and the SRNC stores the D-MSK generated by the AAA server in step 325. It can be further contemplated as another exemplary embodiment of the present invention that the SRNC generates a PMK using the D-MSK and stores the PMK according to the policy of the service provider. In step 327, the SRNC transmits an AR EAP Payload message with the EAP Success message encapsulated to the BS. The EAP Success message is delivered from the BS to the MS by an RLP message in step 329.

Figure 4:
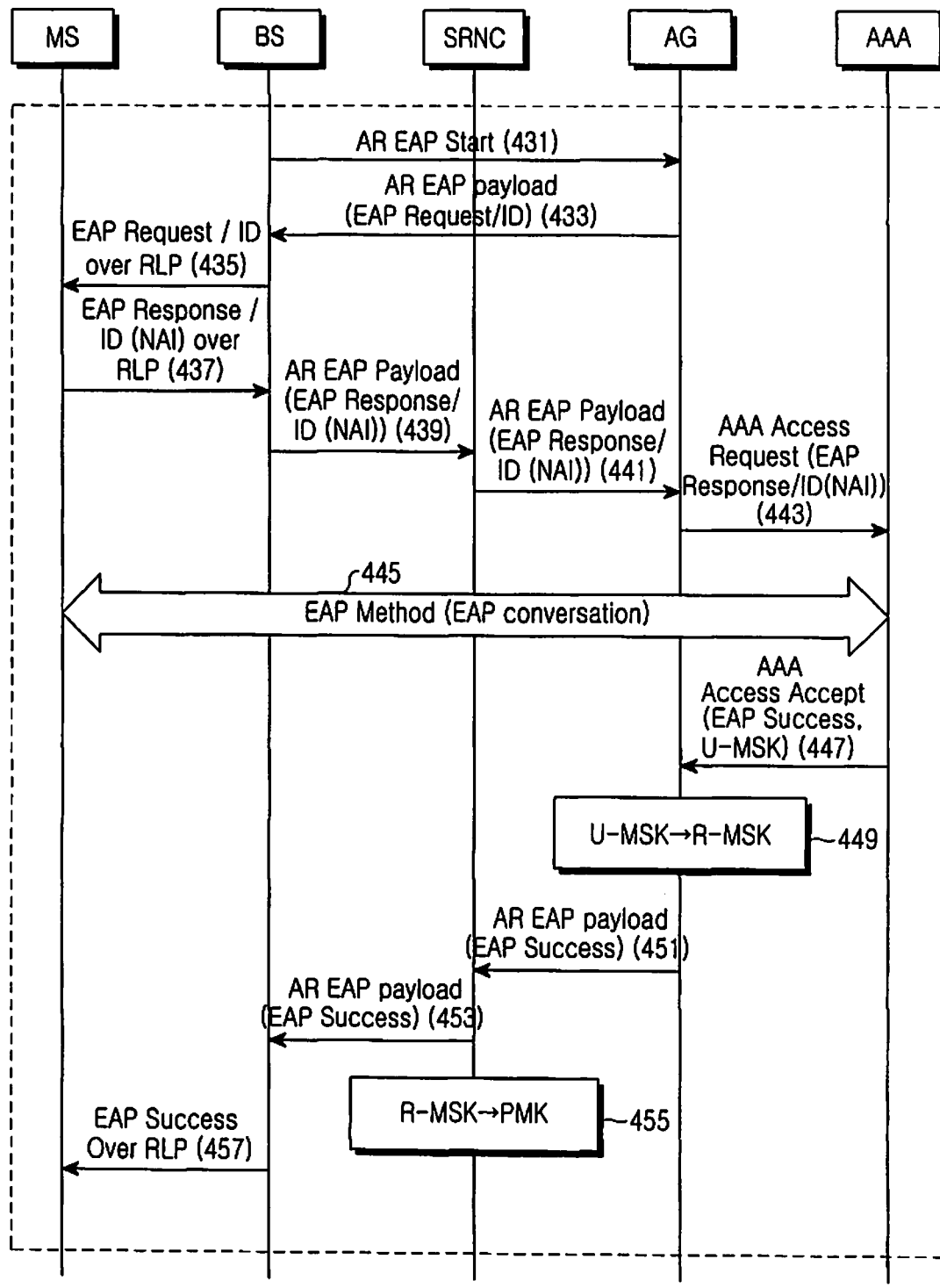
FIG. 4 is a diagram illustrating a message flow for a user authentication procedure according to an embodiment of the present invention.

FIG. 4 is a diagram illustrating a message flow for a user authentication procedure according to an embodiment of the present invention.

Referring to FIG. 4, the BS transmits an AR EAP Start message to the AG to trigger the AG's transmission of an EAP Request message in step 431. Alternatively, the SRNC may receive the AR EAP Start message from the BS and relay it to the AG. The AG transmits an AR EAP payload message with an EAP Request/ID encapsulated to the BS in step 433. Alternatively, the SRNC receives the AR EAP Payload message from the AG and then relays it to the BS. The BS transmits an EAP Request/ID RLP message including the EAP Request/ID to the MS by the RLP in step 435.

The MS transmits an EAP Response/ID RLP message having an EAP Response/ID with a NAI to the BS by the RLP in response to the EAP Request/ID in step 437, and the BS transmits an AR EAP Payload message having the EAP Response/ID with the NAI encapsulated to the SRNC in step 439. In step 441, the SRNC relays the AR EAP Payload having the EAP Response/ID with the NAI encapsulated to the AG. If the AG and the SRNC are configured to be a single physical entity, steps 439 and 441 can be one process that takes place in an internal interface of the physical entity. In step 443, the AG transmits to the AAA server the EAP Response/ID with the NAI encapsulated in an AAA Access Accept message such as a RADIUS access request message or an access request message based on the Diameter AAA protocol. Thus, an EAP negotiation is made between the MS and the AAA server according to an EAP method through the SRNC in step 445.

When the EAP negotiation is completed, the AAA server transmits an EAP Success message and a U-MSK to the AG by an AAA Access Accept message in step 447. Although both or either of the user authentication and the device authentication can be performed according to the service provider's choice, the present invention uses a key used for the user authentication as a root key for a subsequent procedure if the user authentication follows the device authentication. Therefore, the AG induces an R-MSK from the U-MSK received from the AAA server in step 449 and transmits the R-MSK to the SRNC by an AR EAP Payload message with the EAP Success message encapsulated in step 451.

In step 453, the SRNC relays the AR EAP Payload message with the EAP Success message and the R-MSK encapsulated to the BS. If a PMK is generated using the U-MSK, the SRNC induces the PMK from the R-MSK generated from the U-MSK in step 455 and transmits the EAP Success message to the MS by an RLP message in step 457. The MS stores the PMK acquired from the EAP Success message for use during a session.

Figure 5:
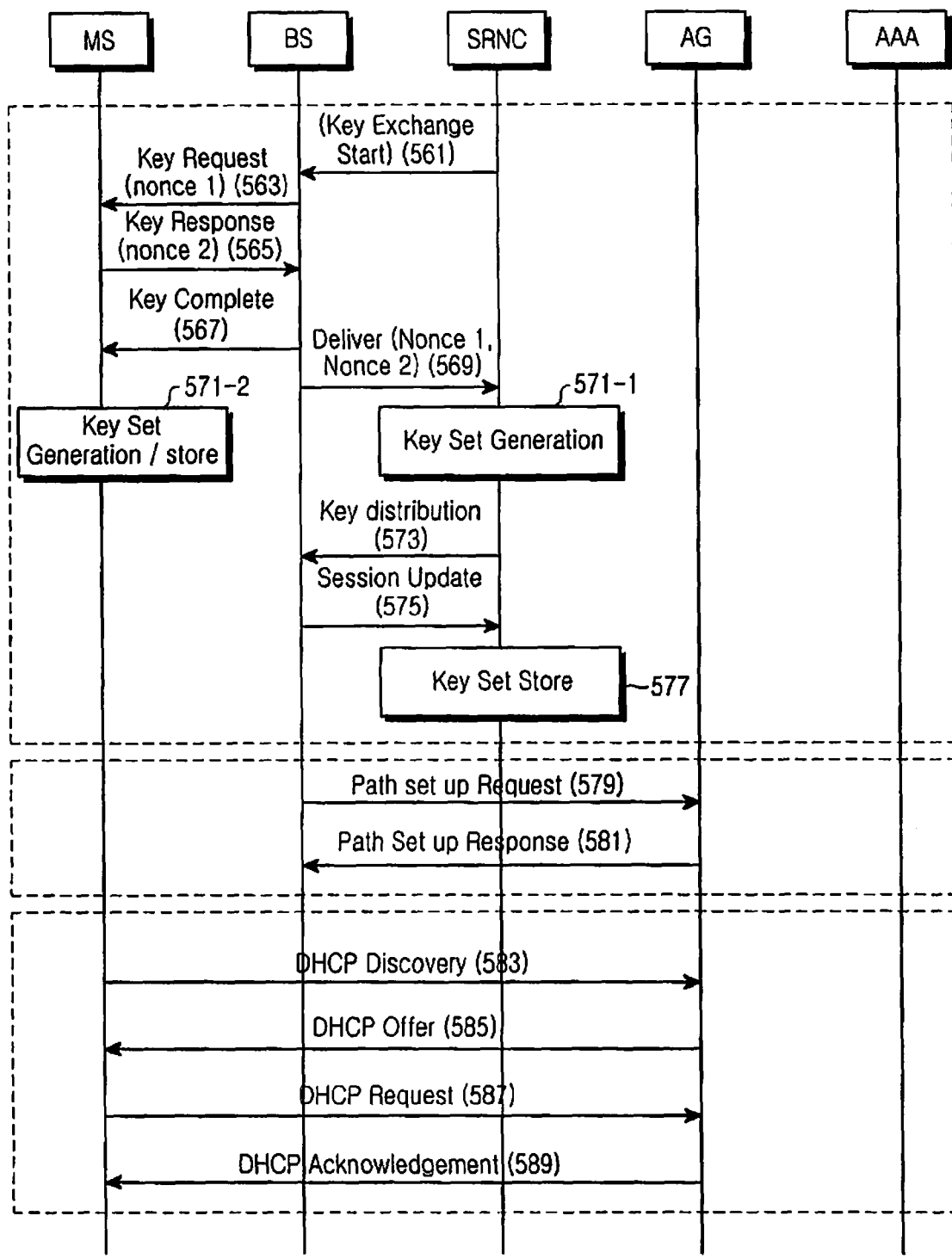
FIG. 5 is a diagram illustrating a message flow for a key generation operation of an SRNC according to an embodiment of the present invention.

FIG. 5 is a diagram illustrating a message flow for a key generation operation of the SRNC according to an embodiment of the present invention. The message flow is for Case 1 depicted as steps 230 to 239 in FIG. 2B.

Referring to FIG. 5, the SRNC notifies the BS that a key exchange, i.e. a 3-way handshake, is needed in step 561. At the same time, the SRNC transmits a key generated from a PMK, i.e. an SRK to the BS, for use in verification of the 3-way handshake. Herein, step 561 may be skipped.

The BS transmits a first nonce, nonce 1, by a Key Request message to the MS in step 563 and receives a second nonce, nonce 2, in correspondence to nonce 1 by a Key Response message from the MS in step 565. In step 567, the BS transmits a Key Complete message indicating success of the 3-way handshake to the MS, considering that nonce 1 and nonce 2 have been verified. The BS transmits the verified nonce 1 and nonce 2 to the SRNC in step 569.

In steps 571-1 and 571-2, the MS and the SRNC individually generate key sets to be used for at least one of data encryption and data integrity check during a session based on the PMK generated in step 455 or the PMK generated in step 325 and the nonces according to the policy of the service provider by the same algorithm. In step 573, the SRNC transmits a Key Distribution message including the key set to the BS. The BS replies to the SRNC with a Session Update message in step 575. Hence, the SRNC determines that the BS has succeeded in the session-related key update and stores the key set for use in later session management in step 577.

When the BS delivers a Path Setup Request message for a bearer setup to the AG in step 579, the AG completes signaling for the bearer setup by transmitting a Path Setup Response message to the BS in step 581. If a simple IP is used for IP address allocation, the MS and the AG exchange a set of known messages such as DHCP Discovery, DHCP Offer, DHCP Request, and DHCP Acknowledgement, thus acquiring an IP address for the MS by the DHCP in steps 583 to 589.

Figure 6:
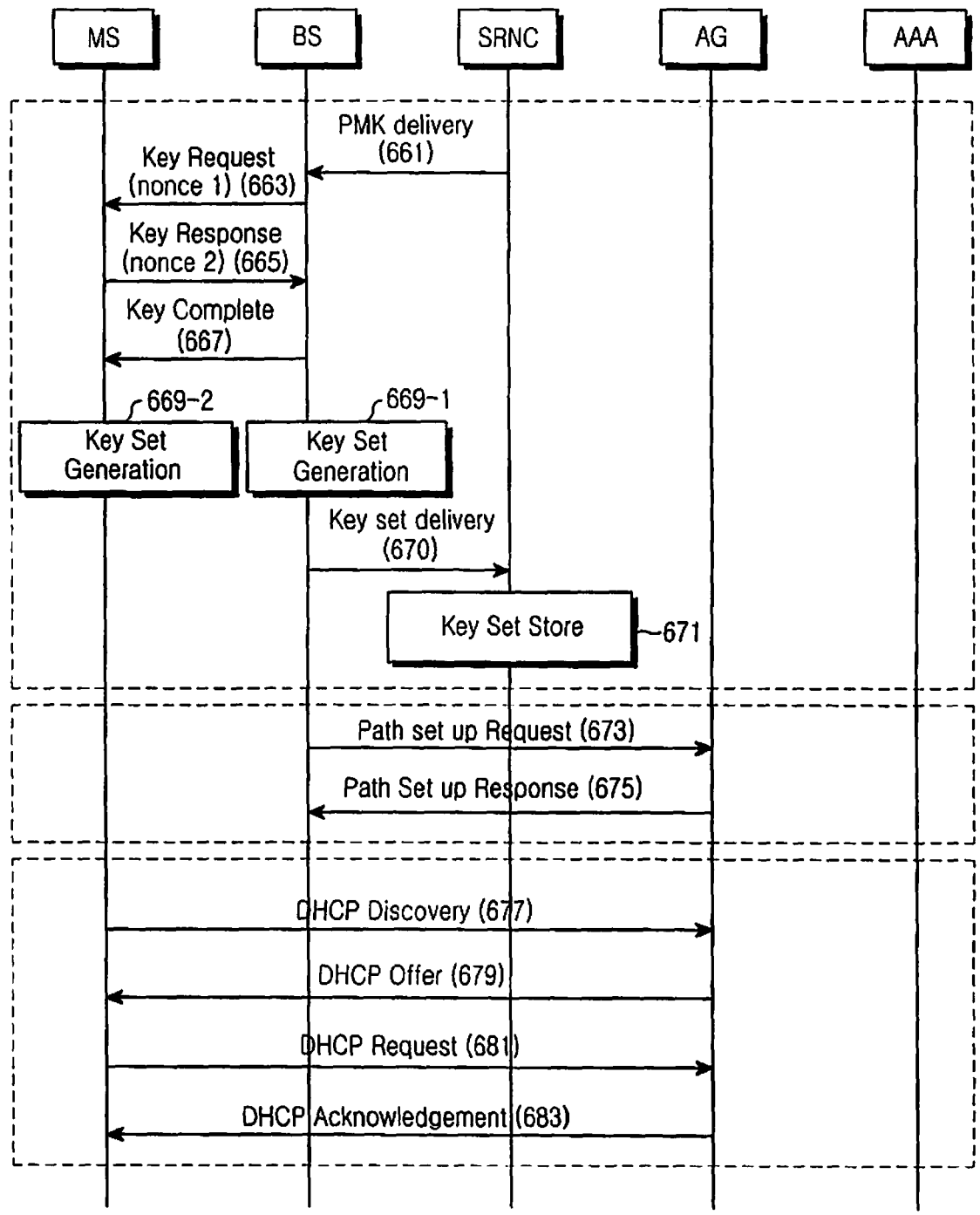
FIG. 6 is a diagram illustrating a message flow for a key generation operation of a BS according to an embodiment of the present invention.

FIG. 6 is a diagram illustrating a message flow for a key generation operation of the BS according to an embodiment of the present invention. The message flow is for Case 2 depicted as steps 255 to 259 in FIG. 2B.

Referring to FIG. 6, the SRNC delivers the PMK generated in step 445 or step 325 to the BS in step 661. The BS transmits nonce 1 by a Key Request message to the MS in step 663 and receives nonce 2 in correspondence to nonce 1 by a Key Response message from the MS in step 665. In step 667, the BS transmits a Key Complete message indicating success of a 3-way handshake to the MS, considering that nonce 1 and nonce 2 have been verified. In steps 669-1 and 669-2, the MS and the BS individually generate key sets to be used for data encryption and data integrity check during a session based on the PMK and the nonces by the same algorithm. The MS can obtain the U-MSK and the D-MSK using a long-term credential and acquires the PMK using the U/D-MSK. In step 670, the BS transmits the key set to the SRNC. The SRNC stores the key set for use in later session management in step 671.

When the BS delivers a Path Setup Request message for a bearer setup to the AG in step 673, the AG completes signaling for the bearer setup by transmitting a Path Setup Response message to the BS in step 675. If a simple IP is used for IP address allocation, the MS and the AG exchange a set of known messages such as DHCP Discovery, DHCP Offer, DHCP Request, and DHCP Acknowledgement, thus acquiring an IP address for the MS by the DHCP in steps 677 to 683.

Figure 7:
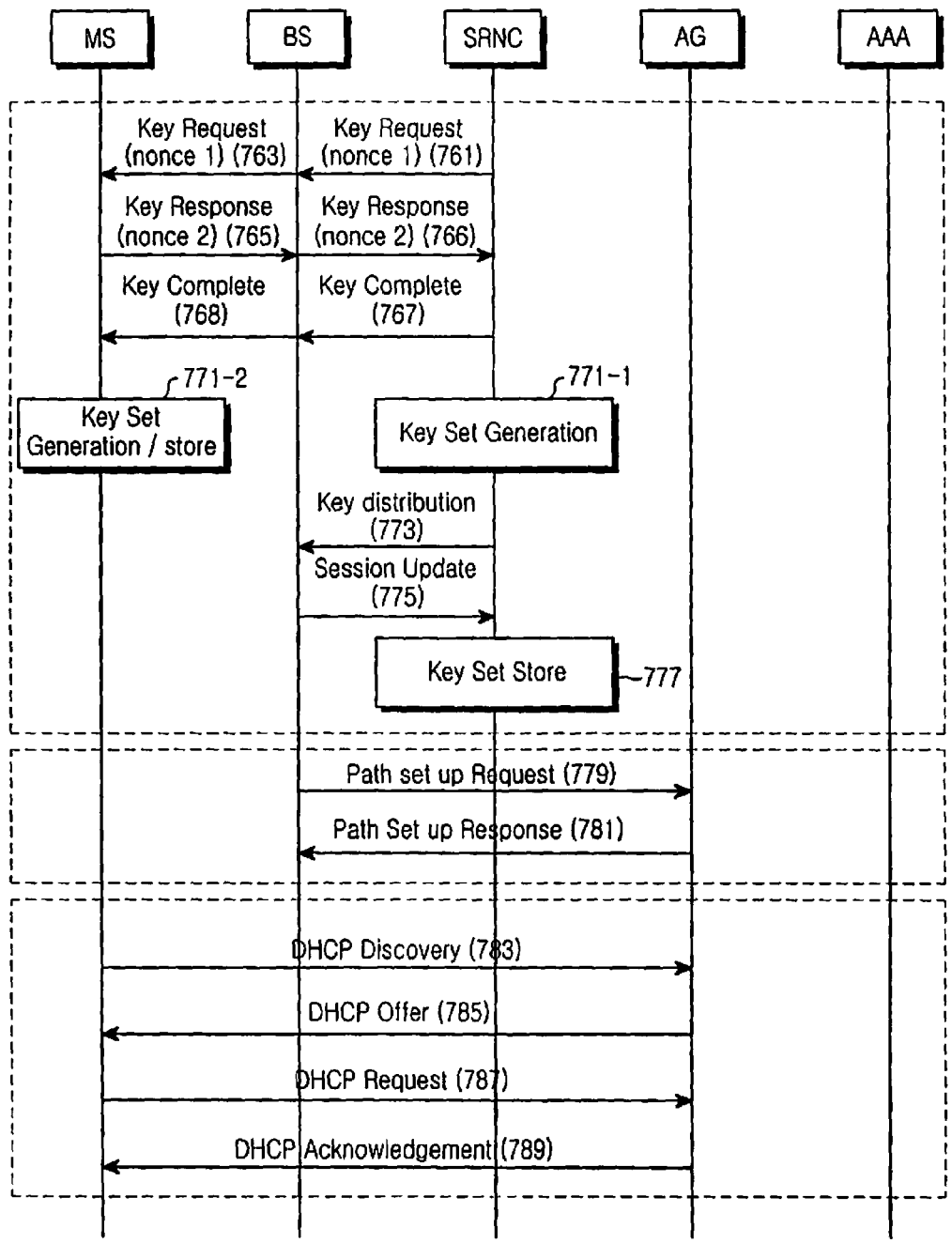
FIG. 7 is a diagram illustrating a message flow for a key generation operation of the SRNC according to another embodiment of the present invention.

FIG. 7 is a diagram illustrating a message flow for a key generation operation of the SRNC according to another embodiment of the present invention. The message flow is for Case 2 depicted as steps 241 to 253 in FIG. 2B.

Referring to FIG. 7, the SRNC transmits a Key Request message including nonce 1 to the BS in order to directly verify a key exchange in step 761 and the BS plays a role as a relay in steps 763 to 768. That is, the BS relays the Key Request message to the MS in step 763, receives a Key Response message including nonce 2 in correspondence to nonce 1 from the MS in step 765, and relays the Key Response message to the SRNC in step 766. In steps 767 and 768, the SRNC completes the key exchange by transmitting a Key Complete message indicating success of a 3-way handshake to the MS.

In steps 771-1 and 771-2, the MS and the SRNC individually generate key sets to be used for data encryption and data integrity check during a session based on the PML generated in step 455 or 325 and the nonces by the same algorithm. In step 773, the SRNC transmits a Key Distribution message including the key set to the BS. The BS replies to the SRNC with a Session Update message in step 775. Hence, the SRNC determines that the BS has succeeded in updating session information and session-related keys and stores the key set for use in later session management in step 777.

When the BS delivers a Path Setup Request message for a bearer setup to the AG in step 779, the AG completes signaling for the bearer setup by transmitting a Path Setup Response message to the BS in step 781. If a simple IP is used for IP address allocation, the MS and the AG exchange a set of known messages such as DHCP Discovery, DHCP Offer, DHCP Request, and DHCP Acknowledgement, thus acquiring an IP address for the MS by the DHCP.

Figure 8:
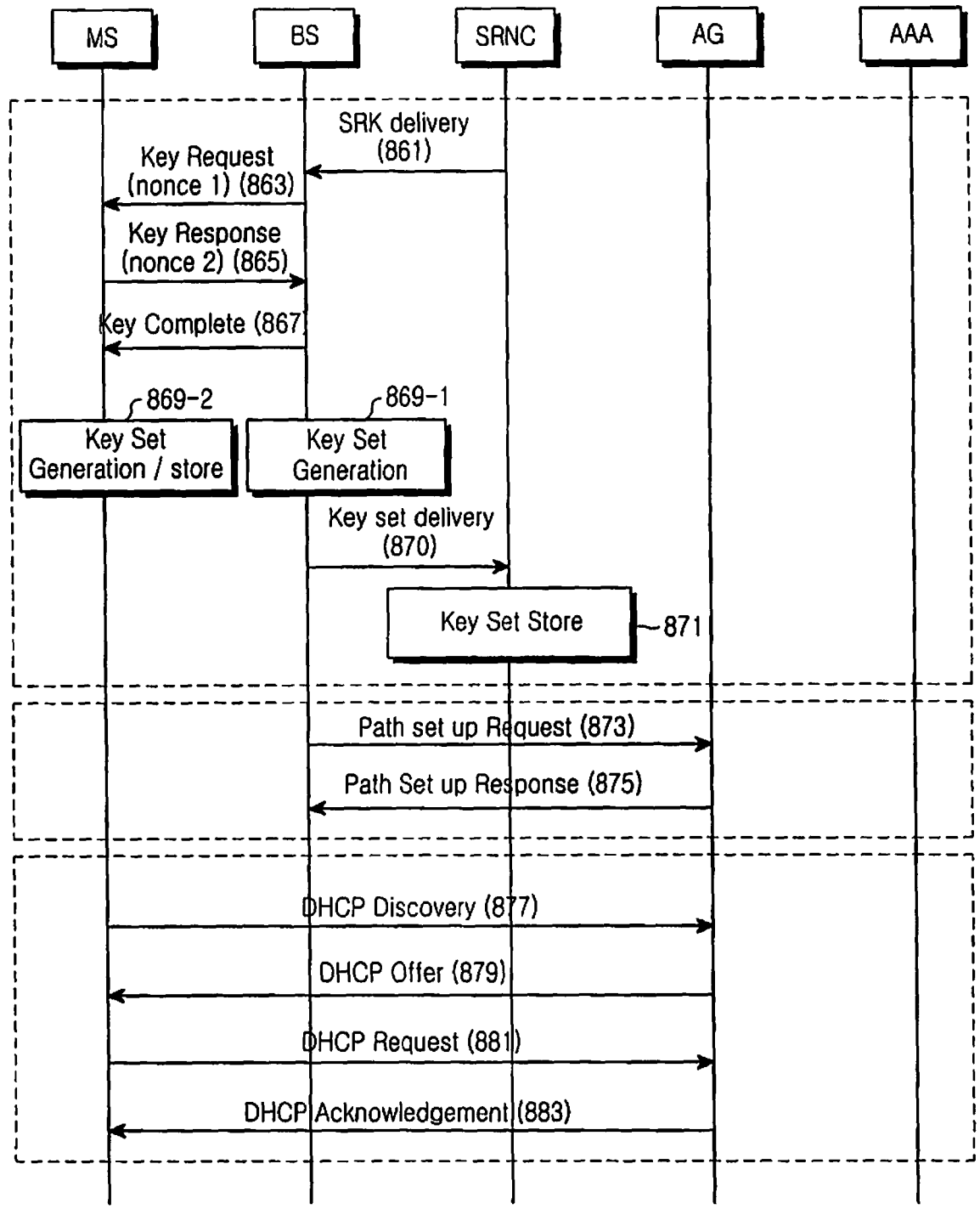
FIG. 8 is a diagram illustrating a message flow for a key generation operation of the BS according to another embodiment of the present invention.

FIG. 8 is a diagram illustrating a message flow for a key generation operation of the BS according to another embodiment of the present invention. The message flow is for Case 4 depicted as steps 261 to 267 in FIG. 2B.

Referring to FIG. 8, the SRNC generates an SRK using the PMK generated in step 445 or step 325 and transmits the SRK to the BS in step 861. The BS transmits nonce 1 by a Key Request message to the MS in step 863 and receives nonce 2 in correspondence to nonce 1 by a Key Response message from the MS in step 865. In step 867, the BS transmits a Key Complete message indicating success of a 3-way handshake to the MS. In steps 869-1, 869-2, the MS and the BS individually generate key sets to be used for data encryption and data integrity check during a session based on the SRK and the nonces by the same algorithm. In step 870, the BS transmits the key set to the SRNC. The SRNC stores the key set for use in later session management in step 871.

When the BS delivers a Path Setup Request message for a bearer setup to the AG in step 873, the AG completes signaling for the bearer setup by transmitting a Path Setup Response message to the BS in step 875. If a simple IP is used for IP address allocation, the MS and the AG exchange a set of known messages such as DHCP Discovery, DHCP Offer, DHCP Request and DHCP Acknowledgement, thus acquiring an IP address for the MS by the DHCP in steps 877 to 883.

As is apparent from the above description, the embodiments of the present invention can advantageously provide authentication and security to a UMB network being the future-generation evolution technology of the 3GPP2. That is, the embodiments of the present invention overcome the authentication and security problem encountered with 3GPP2 1×EV-DO that channel hijacking is easy and unauthorized use of a service without payment of a lawful charge for the service is possible, and more securely prevent denial of a service caused by a message attack at a protocol level as well as an RF level.

Therefore, device authentication and user authentication can be performed more securely and communications can be more efficient. Also, authentication can be efficiently performed in a PPP-free environment.

While the invention has been shown and described with reference to certain preferred embodiments of the present invention thereof, it will be understood by those skilled in the art that various changes in form and details may be made therein without departing from the spirit and scope of the present invention as defined by the appended claims.

What is claimed is:

1. A method for performing device authentication and user authentication of a Mobile Station (MS) in a mobile communication network, comprising the steps of:
    establishing a connection between the MS and a Signaling Radio Network Controller (SRNC) that controls communications of the MS through a Base Station (BS);
    receiving a Device-Master Session Key (D-MSK) for device authentication of the MS from an Authentication, Authorization and Accounting (AAA) server that has completed an Extensible Authentication Protocol (EAP) negotiation with the MS and storing the D-MSK by the SRNC, when the BS triggers an EAP authentication after the connection establishment;
    receiving a Root-MSK (R-MSK) from an Access Gateway (AG) and storing the R-MSK by the SRNC after the connection establishment, the R-MSK being generated using a User-MSK (U-MSK) for user authentication of the MS received from the AAA server by the AG;
    generating a Pairwise Master Key (PMK) for use during a session using at least one of the D-MSK and the R-MSK by the SRNC;
    generating a key set using the PMK by one of the BS and the SRNC, for use in at least one of data encryption, data integrity check, and session management during the session;
    transmitting a path setup request message for a bearer setup to the AG by the BS, after the key set generation; and
    completing signaling for the bearer setup in response to the path setup message and transmitting a path setup response message to the BS by the AG.

2. The method of claim 1, further comprising generating a second key set using the PMK by the MS, for use in at least one of data encryption, data integrity check, and session management during the session.

3. The method of claim 1, wherein generating a key set comprises:
    transmitting a first nonce in a key request message to the MS and receiving a second nonce corresponding to the first nonce in a key response message from the MS by the BS;
    transmitting a key complete message indicating that the first and second nonces have been verified to the MS and transmitting the first and second nonces to the SRNC by the BS;
    generating the key set based on the PMK and the nonces by the MS and the SRNC; and
    transmitting a key distribution message comprising the key set to the BS and, upon receipt of a session update message from the BS, storing the key set by the SRNC.

4. The method of claim 1, wherein generating a key set comprises:
    transmitting the PMK to the BS by the SRNC;
    transmitting a first nonce in a key request message to the MS and receiving a second nonce corresponding to the first nonce in a key response message from the MS by the BS;
    transmitting a key complete message indicating that the first and second nonces have been verified to the MS by the BS;
    generating the key set based on the PMK and the nonces by the MS and the BS; and
    transmitting the key set to the SRNC by the BS and storing the key set by the SRNC.

5. The method of claim 1, wherein generating a key set comprises:
    transmitting a first nonce in a key request message to the MS through the BS and receiving a second nonce corresponding to the first nonce in a key response message from the MS by the SRNC;
    transmitting a key complete message indicating that the first and second nonces have been verified to the MS by the SRNC;
    generating the key set based on the PMK and the nonces by the MS and the SRNC; and
    transmitting a key distribution message comprising the key set to the BS and, upon receipt of a session update message from the BS, storing the key set by the SRNC.

6. The method of claim 1, wherein generating a key set comprises:
    generating a Session Root Key (SRK) using the PMK and transmitting the SRK to the BS by the SRNC;
    transmitting a first nonce to the MS in a key request message and receiving a second nonce corresponding to the first nonce in a key response message from the MS by the BS;
    transmitting a key complete message indicating that the first and second nonces have been verified to the MS by the BS;
    generating the key set based on the SRK and the nonces by the MS and the BS; and
    transmitting the key set to the SRNC by the BS and storing the key set by the SRNC.

7. The method of claim 1, further comprising acquiring an Internet Protocol (IP) address of the MS by a Dynamic Host Configuration Protocol (DHCP) procedure between the MS and the AG, after the completion of signaling for the bearer setup.

8. A mobile communication network for performing device authentication and user authentication of a Mobile Station (MS), comprising:
- a Base Station (BS) connected to the MS by a Radio Link Protocol (RLP); and
- a Signaling Radio Network Controller (SRNC) for: receiving a Device-Master Session Key (D-MSK) for device authentication of the MS from an Authentication, Authorization and Accounting (AAA) server that has completed an Extensible Authentication Protocol (EAP) negotiation with the MS and storing the D-MSK, when the BS triggers an EAP authentication after a connection is established with the MS through the BS; receiving a Root-MSK (R-MSK) from an Access Gateway (AG) and storing the R-MSK, the R-MSK being generated using a User-MSK (U-MSK) for user authentication of the MS received from the AAA server by the AG; and generating a Pairwise Master Key (PMK) for use during a session using at least one of the D-MSK and the R-MSK,
- wherein a key set is generated using the PMK by one of the BS and the SRNC, for use in at least one of data encryption, data integrity check, and session management during the session, and
- wherein when the BS transmits a path setup request message for a bearer setup to the AG after the key set generation, the AG completes signaling for the bearer setup in response to the path setup message and transmits a path setup response message to the BS.

9. The mobile communication network of claim 8, wherein the MS generates a second key set using the PMK, for use in at least one of data encryption, data integrity check, and session management during the session.

10. The mobile communication network of claim 8, wherein the BS transmits a first nonce in a key request message to the MS, receives a second nonce corresponding to the first nonce in a key response message from the MS, transmits a key complete message indicating that the first and second nonces have been verified to the MS, and transmits the first and second nonces to the SRNC, the MS and the SRNC generate the key set based on the PMK and the nonces, and the SRNC transmits a key distribution message comprising the key set to the BS and, upon receipt of a session update message from the BS, stores the key set.

11. The mobile communication network of claim 8, wherein the SRNC transmits the PMK to the BS, the BS transmits a first nonce in a key request message to the MS, receives a second nonce corresponding to the first nonce in a key response message from the MS, and transmits a key complete message indicating that the first and second nonces have been verified to the MS, the MS and the BS generate the key set based on the PMK and the nonces, and when the BS transmits the key set to the SRNC, the SRNC stores the key set.

12. The mobile communication network of claim 8, wherein the SRNC transmits a first nonce in a key request message to the MS through the BS, receives a second nonce corresponding to the first nonce in a key response message from the MS, and transmits a key complete message indicating that the first and second nonces have been verified to the MS, the MS and the SRNC generate the key set based on the PMK and the nonces, and the SRNC transmits a key distribution message comprising the key set to the BS and, upon receipt of a session update message from the BS, stores the key set.

13. The mobile communication network of claim 8, wherein the SRNC generates a Session Root Key (SRK) using the PMK and transmits the SRK to the BS, the BS transmits a first nonce to the MS in a key request message, receives a second nonce corresponding to the first nonce in a key response message from the MS, and transmits a key complete message indicating that the first and second nonces have been verified to the MS, the MS and the BS generate the key set based on the SRK and the nonces, and when the BS transmits the key set to the SRNC, the SRNC stores the key set.

14. The mobile communication network of claim 8, wherein the MS and the AG acquire an Internet Protocol (IP) address of the MS by a Dynamic Host Configuration Protocol (DHCP) procedure, after the completion of signaling for the bearer setup.

* * * * *